(12) United States Patent
Hashigaya

(10) Patent No.: US 6,511,215 B2
(45) Date of Patent: Jan. 28, 2003

(54) HEADLAMP

(75) Inventor: Kazuya Hashigaya, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/863,615

(22) Filed: May 23, 2001

(65) Prior Publication Data

US 2001/0046139 A1 Nov. 29, 2001

(30) Foreign Application Priority Data

May 24, 2000 (JP) ........................................ 2000-152338

(51) Int. Cl.[7] .................................................. F21S 8/10
(52) U.S. Cl. ...................... 362/515; 362/514; 362/518; 362/523; 362/460; 362/475; 362/544
(58) Field of Search ................................. 362/515, 460, 362/475, 476, 518, 523, 525, 514, 544

(56) References Cited

U.S. PATENT DOCUMENTS

| | | | |
|---|---|---|---|
| 3,710,097 A | 1/1973 | Bright et al. | |
| 4,144,558 A | 3/1979 | Ferrell | |
| 5,209,558 A | * 5/1993 | Suzuki et al. | ................ 362/243 |
| 5,678,916 A | * 10/1997 | Watanabe et al. | ............ 362/265 |

FOREIGN PATENT DOCUMENTS

| | | |
|---|---|---|
| JP | S58-68602 | 5/1983 |
| JP | H8-264005 | 10/1996 |

* cited by examiner

Primary Examiner—Sandra O'Shea
Assistant Examiner—Mark Tsidulko
(74) Attorney, Agent, or Firm—Koda & Androlia

(57) ABSTRACT

A lamp apparatus or a vehicle headlamp having first and second lamp units that are provided adjacent to each other in the lateral direction so as to tilt in a lamp body by first and second aiming mechanisms, respectively. First supporting portions for supporting a fulcrum pin and aiming screws of the fast aiming mechanism are provided behind the first lamp unit in the lamp body, and second supporting portions for supporting a fulcrum pin and aiming screws of the second aiming mechanism are provided behind the second lamp unit in the lamp body; and at least one of the plurality of first supporting portions and at least one of the plurality of second supporting portions are provided so as to overlap each other in a direction in which the lamp units are disposed when the headlamp is viewed from front.

10 Claims, 7 Drawing Sheets

FIG. 6A LOW BEAM

FIG. 6B HIGH BEAM

HEADLAMP

BACKGROUND OF THE INVENTION

1. Field of the Invention

The present invention relates to a vehicle headlamp that includes in a lamp chamber thereof a plurality of tiltable lamp units.

2. Prior Art

In one known vehicle headlamp structure, a plurality of lamp units that are installed so as to tilt are housed in a lamp chamber thereof that is defined by a front cover and a lamp body.

For example, in Japanese Utility Model Application Publication No. S58-68602, a pair of right and left lamp units are housed side by side in a lamp chamber, and these two lamp units are tiltably provided in the lamp body by corresponding aiming mechanisms. In this vehicle headlamp, a plurality of (three) supporting portions for supporting a plurality of aiming members (that comprise an aiming fulcrum pin and two aiming screws) that constitute the aiming mechanism are provided in the back of each one of the two lamp units.

In this conventional vehicle headlamp, one lamp unit and its aiming mechanism form a unit. As a result, a plurality of supporting portions are provided with certain distances in between in the lateral direction for each lamp unit. Thus, the lamp structure needs a certain lateral length. However, this causes a problem. A compact lamp apparatus cannot be easily built.

Such a problem can be solved by installing a single aiming mechanism that can tilt a pair of lamp units as disclosed in, for instance, Japanese Patent Application Laid-Open (Kokai) No. H8-264005. This arrangement, however, causes a new problem. It is not possible to independently make an aiming adjustment of each lamp unit.

SUMMARY OF THE INVENTION

In view of the above, the object of the present invention is to provide a vehicle headlamp that includes a plurality of lamp units, wherein not only can the vehicle headlamp be made compact but also the aiming adjustment can be performed independently for each one of the lamp units.

The present invention accomplishes this object by way of devising a novel structure for an aiming mechanism for each lamp unit.

More specifically, the present invention is for a vehicle headlamp in which first and second lamp units are housed adjacent to each other in a lamp chamber that is defined by a front cover and a lamp body and provided in a tiltable fashion in the lamp body by first and second aiming mechanisms, respectively, and in the present invention:

- a plurality of first supporting portions for supporting a plurality of aiming members that constitute the first aiming mechanism are provided in the rear portion of the first lamp unit in the lamp body, and a plurality of second supporting portions for supporting a plurality of aiming members that constitute the second aiming mechanism are provided in the rear portion of the second lamp unit in the lamp body; and
- at least one of the plurality of the first supporting portions and at least one of the plurality of the second supporting portions are provided so as to overlap each other with reference to a direction of sidewise installation of the first and second lamp units.

In this structure, the first and second lamp units are housed in the lamp chamber adjacent to each other, and they are installed laterally, vertically or obliquely.

The vehicle headlamp contains two (the first and second) lamp units in the lamp chamber, and it may contain an additional third lamp unit. When the third lamp unit is installed and it has its own aiming mechanism, then a plurality of supporting portions for supporting a plurality of aiming members that constitute the aiming mechanism of the third lamp unit are provided between the first and second supporting portions of the first and second lamp units.

The structure of each one of the lamp units is not limited. For example, the lamp unit may be of a parabola type that has a reflector formed with reference to a rotary parabolic plane or the like. The lamp unit may also be of a projector type that is comprised of: a light source that is disposed in substantially coaxial with an optical axis that extends in a vehicle longitudinal direction, a reflector that reflects the light from the light source toward the front and toward the optical axis, and a condensing lens provided in front of the reflector.

The structure of the light source for each one of the lamp units is not limited, either. The light source can be a discharge light emitting portion of a discharge bulb, and it also can be a filament of an incandescent bulb such as a halogen bulb.

As seen from the above, in the vehicle headlamp structure according to the present invention, the first and second lamp units that are housed adjacent to each other in the lamp chamber are installed tiltably in the lamp body by the first and second aiming mechanisms, respectively. In addition, a plurality of first supporting portions for supporting the plurality of aiming members that constitute the first aiming mechanism are provided behind the first lamp unit in the lamp body, and a plurality of second supporting portions for supporting the plurality of aiming members that constitute the second aiming mechanism are provided behind the second lamp unit in the lamp body. In this structure, at least one of the plurality of the first supporting portions and at least one of the plurality of the second supporting portions are provided so as to overlap each other in the arranging direction of the two lamp units that are installed sideways when viewed the lamp body from the front. As a result, the present invention provides the operational advantages as described below.

Though in the prior art, a lamp unit and its aiming mechanism are designed as a single lamp structural unit, and a plurality of these lamp structural units are disposed parallel to each other; in the present invention, at least a part of one lamp unit and at least a part of another lamp unit are installed in an overlapped positional relationship in the direction of the height of the lamp body so that these lamp units are geometrically associated with each other. This reduces the width of the lamp body in the direction of installation of the lamp units.

According to the vehicle headlamp of the present invention that has in its lamp chamber a plurality of lamp units in a tiltable fashion, the headlamp can be made compact, and an aiming adjustment can be made independently for each one of the lamp units.

In the present invention, the second lamp unit can be installed somewhat behind the first lamp unit. Accordingly, for a lamp apparatus (headlamp) which has a front cover that curves to extend from the first lamp unit to the second lamp unit that is behind the first lamp unit, the lamp apparatus can be formed compact since the present invention effectively utilizes the inner space of the lamp chamber.

In the above structure, a front stage portion and a rear stage portion, which are offset from each other in the longitudinal (front and back) direction in the lamp chamber, is formed at a position at which at least one of the first supporting portions of the first lamp unit is provided behind at least one of the second supporting portions of the second lamp unit; and at least one of the first supporting portions is provided on the front stage portion, and at least one of the second supporting portions is provided on the rear stage portion. In this structure, such two lamp units and the aiming mechanisms therefor are disposed without any interfere with each other.

In addition, in the above structure, the second lamp unit disposed behind the first lamp unit can be a projector type lamp unit. The projector type lamp unit generally has a narrower opening than the lamp unit of a parabola type in regards to a reflector; as a result, each of the aiming members that constitute the aiming; mechanism of the projector type lamp is provided at a position away from the reflector when viewed from the front. Accordingly, when the projector type lamp unit is installed as the second lamp unit of the present invention, the light distribution performance of the second lamp unit will not be hindered, even if the reflector or other parts of the first lamp unit is disposed in front of each aiming member of the projector type second lamp unit. Thus, the width of the lamp apparatus (headlamp) can be effectively reduced.

DETAILED DESCRIPTION OF THE INVENTION

Hereafter, the embodiments of the present invention will be described with reference to the accompanying drawings.

Figure 1:
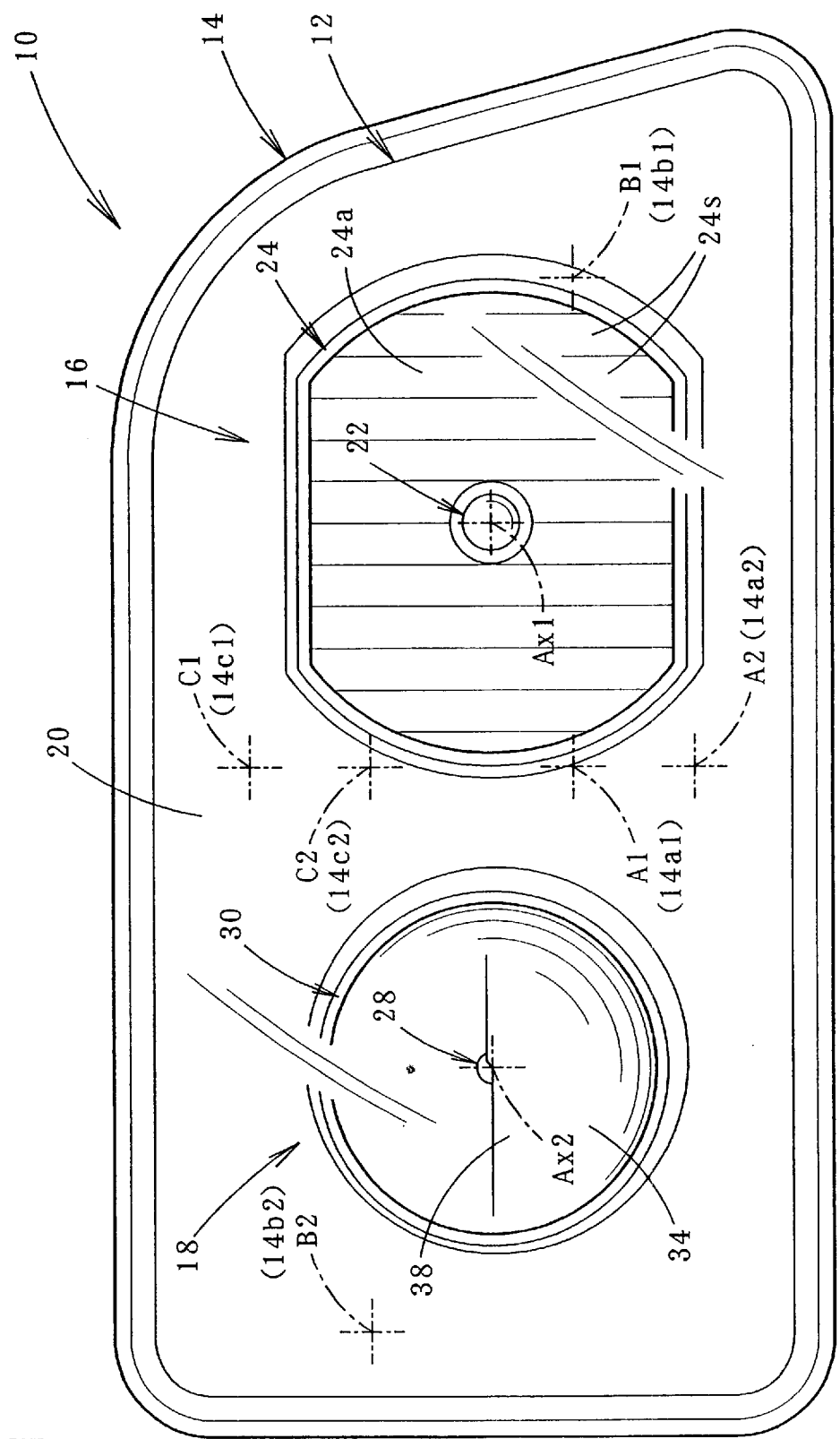
FIG. 1 is a front elevational view of the vehicle headlamp according to one embodiment of the present invention.

As seen from FIGS. 1 through 3, the vehicle headlamp (lamp apparatus) 10 of the present invention will be described with reference to the right-hand side headlamp of a pair of four-lamp system headlamps provided in the front of a vehicle. The vehicle headlamp 10 comprises first and second lamp units 16 and 18 that are housed adjacent to each other in the lateral direction in a lamp chamber defined by a transparent front cover 12 and a lamp body 14. An extension panel 20 is provided in front of the two lamp units 16 and 18 (see FIG. 2) so as to enclose these lamp units 16 and 18.

Figure 6:
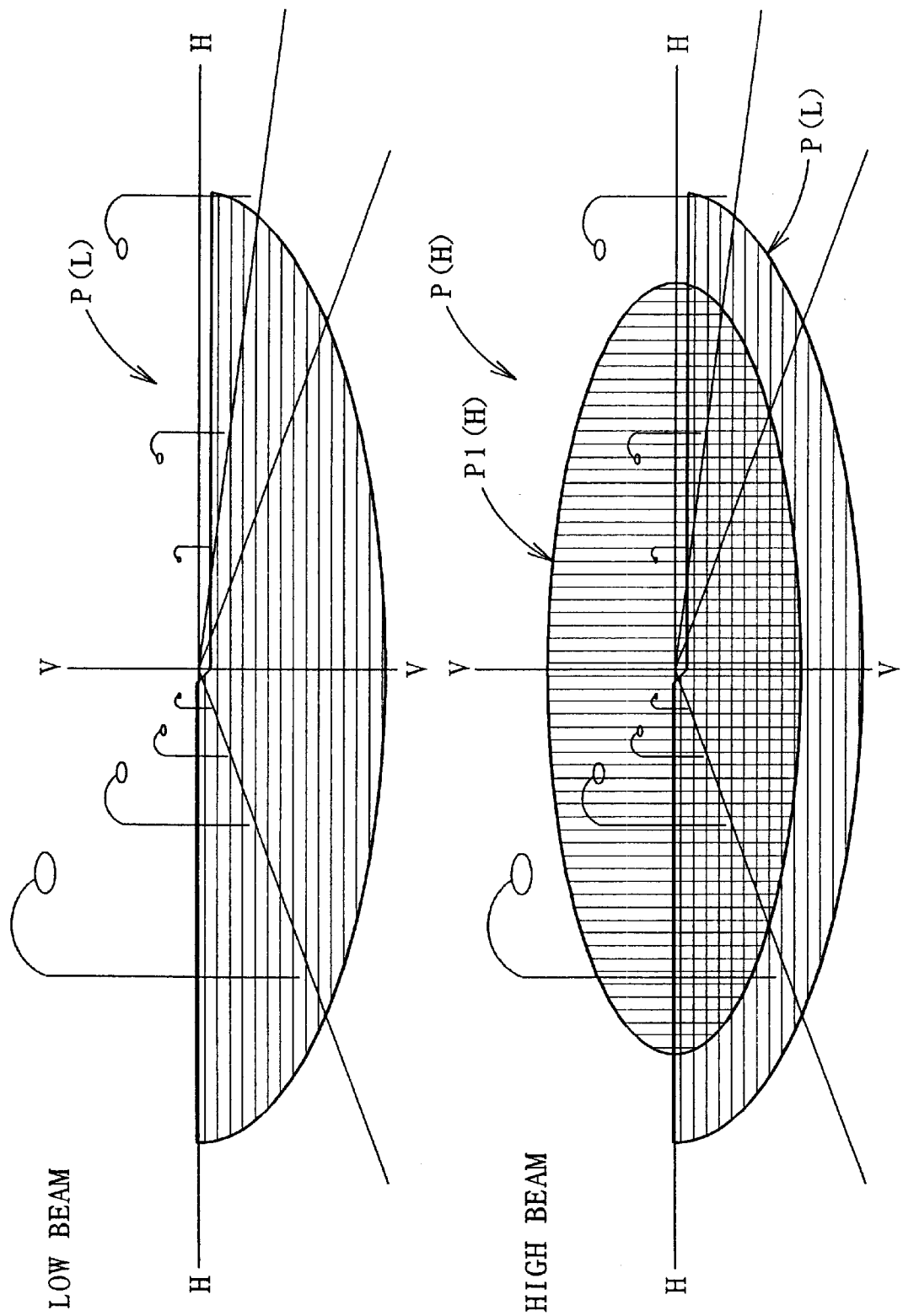
FIGS. 6A and 6B show the light distribution patterns of the beams of light emitted toward the front from the vehicle headlamp of the present invention.

The lamp units 16 and 18 have a lamp light distribution control function. Thus, when the second lamp unit 18 is turned ON, a light distribution pattern P (L) for low beam as shown in FIG. 6A is formed; and when the two lamp units 16 and 18 are both turned ON at the same time, a light distribution pattern P (H) for high beam, in which an additional light distribution pattern P1 (H) for high beam is superposed on the light distribution pattern P (L) for low beam, is formed as shown in FIG. 6B.

The first lamp unit 16 is a parabola type lamp unit, comprising a halogen bulb 22 and a reflector 24.

The halogen bulb 22 is mounted to the reflector 24 so that a filament 22a thereof is on an optical axis Ax1 that extends in the vehicle longitudinal direction. The reflector 24 comprises a reflecting surface 24a that has a plurality of reflecting elements 24s formed on a rotary parabolic surface formed about the optical axis Ax1. The reflector 24 diffuses, deflects and reflects appropriately a light from the filament 22a toward the front, thereby forming the additional light distribution pattern P1 (H) for high beam.

The second lamp unit 18 is a projector type lamp unit, and it comprises a discharge bulb 28, a reflector 30, a holder 32, a condensing lens 34, a retaining ring 36, and a shade 38.

The discharge bulb 28 is mounted to the reflector 30 so that a discharge light emitting portion 28a (a light source) is on an optical axis Ax2 that extends in the vehicle longitudinal direction. The reflector 30, comprising a reflecting surface 30a of a generally elliptically spherical shape formed with the optical Ax2 as its center axis, is designed so that it reflects a light from the discharge light emitting portion 28a toward the front and toward the optical axis Ax2. The holder 32 is in a cylindrical shape extending toward the front from a front end opening of the reflector 30. The rear end of the holder 32 is screwed in position to the reflector 30, and the front end of the holder 32 fixes and supports the condensing lens 34 by way of the retaining ring 36. The condensing lens 34 is a plain convex lens that condenses the light reflected by the reflecting surface 30a of the reflector 30 toward the optical axis Ax2. The shade 38 is integrally formed with the holder 32 at a focal position of the condensing lens 34, and it shields a part of the light reflected by the reflecting surface 30a of the reflector 30. An upward illuminating light emitted from the second lamp unit 18 is thus eliminated, forming the light distribution pattern P (L) for low beam.

Figure 2:
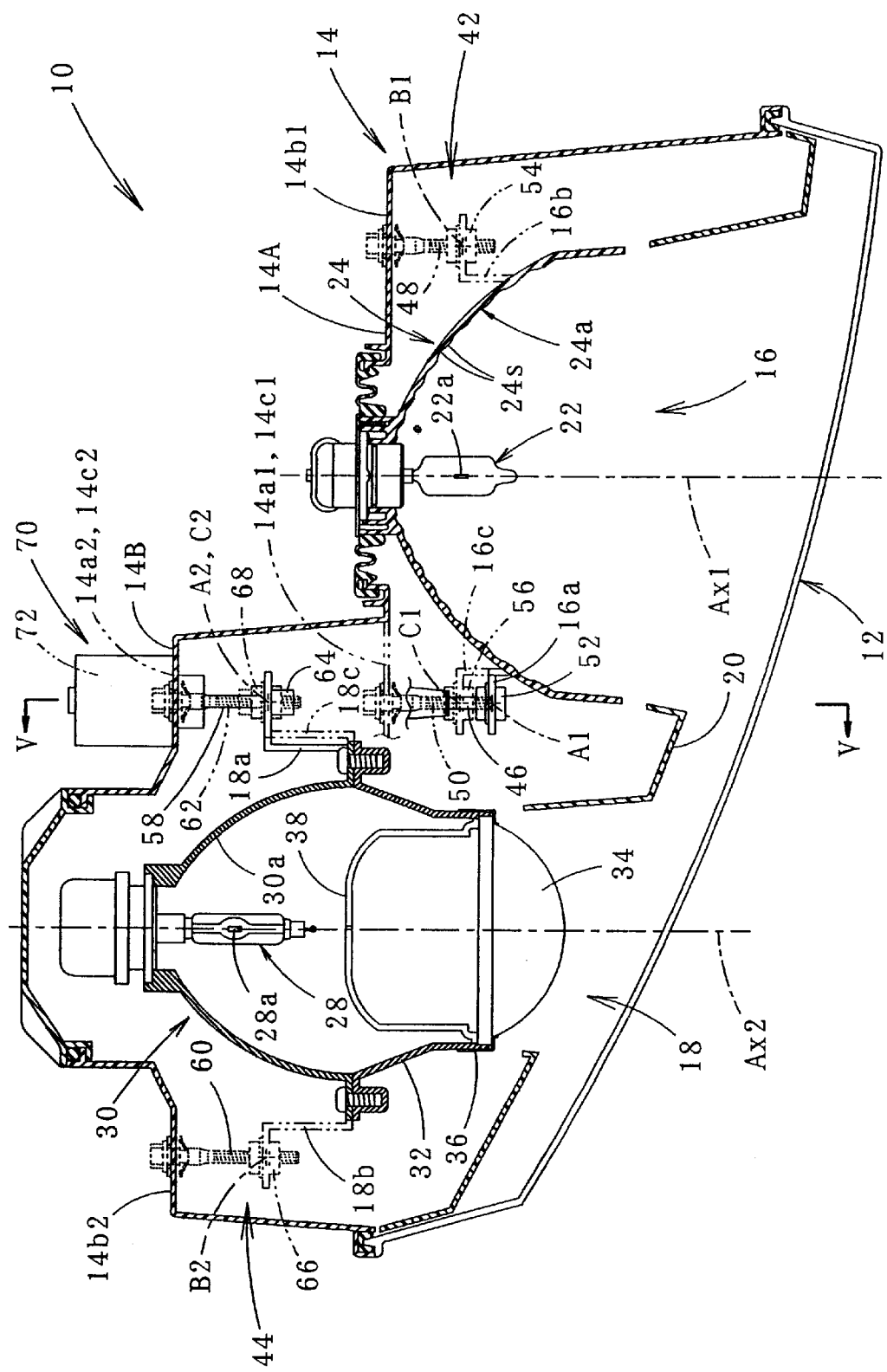
FIG. 2 is a horizontal cross-sectional view thereof.

The front cover 12 is, as best seen from FIG. 2, formed so that its surface is curved toward the back and extend from an inner side of the vehicle width direction to an outer side of the vehicle width direction. In addition, the two lamp units 16 and 18 are disposed so that the lamp unit 18 located on the outer side in the vehicle width direction is offset toward the back with respect to the first lamp unit 16 located on the inner side in the vehicle width direction. In this conjunction, the lamp body 14 has two stages, one in the front and another in the back. In other words, the rear portion of the first lamp unit 16 in the lamp body 14 is a front stage portion 14A, and the rear portion of the second lamp unit 18 in the lamp body 14 is a rear stage portion 14B. The rear stage portion 14B is spaced with a predetermined distance toward the back of the lamp body 14 with respect to the front stage portion 14A.

Figure 4:
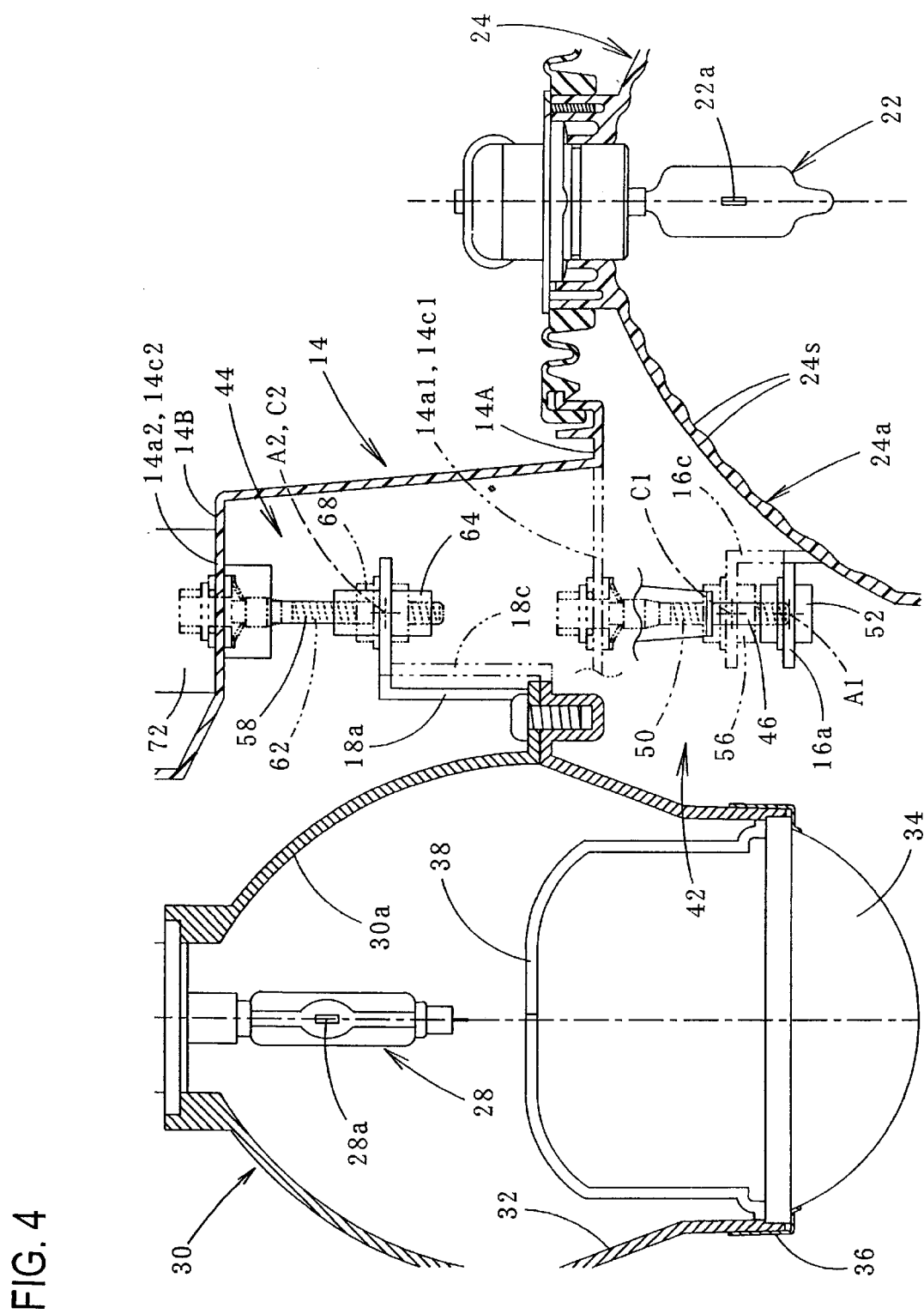
FIG. 4 is an enlarged illustration of the essential portion of the headlamp shown in FIG. 2.
Figure 5:
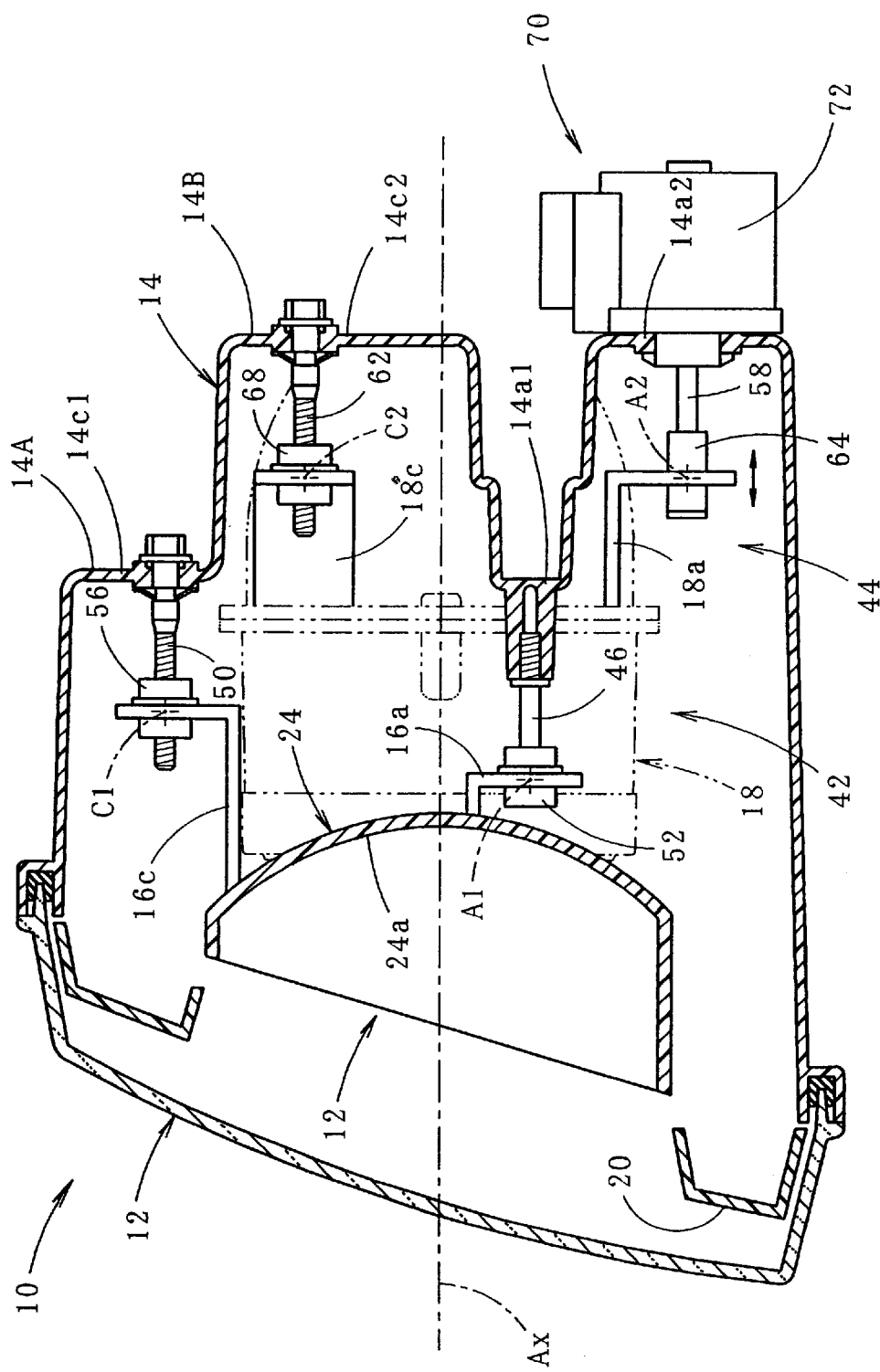
FIG. 5 is a cross sectional view taken along the line V—V of FIG. 2.

As seen from FIGS. 4 and 5, the first lamp unit 16 is mounted to the lamp body 14 so as to be tiltable both in the vertical and lateral directions by a first aiming mechanism 42. As a result, an aiming adjustment can be performed, and the optical axis Ax1 is adjusted to illuminate the additional light distribution pattern P1 (H) for high beam into a required direction. Likewise, the second lamp unit 18 is also mounted to the lamp body 14 so as to be tiltable both in the vertical and lateral directions by a second aiming mechanism 44. Thus, an aiming adjustment is performed, and the optical axis Ax2 is adjusted to illuminate the light distribution pattern P (L) for low beam into a required direction.

The first aiming mechanism 42 comprises one fulcrum pin 46 (an aiming member) and two aiming screws 48 and 50

(aiming members). These aiming members 46, 48 and 50 are arranged in a letter L shape when the lamp apparatus is viewed from the front, and they respectively extend in the vehicle longitudinal direction. Three first supporting portions 14a1, 14b1 and 14c1, that respectively support the fulcrum pin 46 and the aiming screws 48 and 50, are provided in the rear portion of the first lamp; unit 16 that is installed in the lamp body 14. The fulcrum pin 46 is screwed at its base edge portion to the first supporting portion 14a1, and each of the aiming screws 48 and 50 is rotatably supported by each one of the first supporting portions 14b1 and 14c1.

The tip portion (front end) of the fulcrum pin 46 is shaped into a sphere and is mounted with a spherical nut 52. Each of the aiming screws 48 and 50 is mounted with aiming nuts 54 and 56. These spherical nut 52 and aiming nuts 54 and 56 are engaged with three brackets 16a, 16b and 16c formed on the first lamp unit 16, respectively. The center point of the spherical nut 52 forms an aiming fulcrum A1, the center point of the aiming nut 54 forms an active aiming point B1 in lateral direction, and the center point of the aiming nut 56 forms an active aiming point C1 in vertical direction. As a result, when the aiming screw 48 is turned, the first lamp unit 16 tilts in the lateral direction about a straight (imaginary) line that connects the aiming fulcrum A1 and the active aiming point C1. The first lamp unit 16 tilts in the vertical direction about a straight (imaginary) line that connects the aiming fulcrum A1 and the active aiming point B1 when the aiming screw 50 is turned.

The second aiming mechanism 44, on the other hand, comprises one fulcrum pin 58 (an aiming member) and two aiming screws 60 and 62 (aiming members). These aiming members 58, 60 and 62 are arranged in an inverted letter L shape when the lamp apparatus is viewed from the front, and they respectively extend in the vehicle longitudinal direction. Three second supporting portions 14a2, 14b2 and 14c2, that respectively support the fulcrum pin 58 and the aiming screws 60 and 62, are provided in the rear portion of the second lamp unit 18 that is installed in the lamp body 14. The fulcrum pin 58 constitutes a part of a leveling mechanism 70 (explained below) that is provided on the second supporting portion 14a2, and each of the aiming screws 60 and 62 is rotatably supported by the second supporting portions 14b2 and 14c2, respectively.

The tip portion of the fulcrum pin 58 is shaped into a sphere and is mounted with a spherical nut 64. Each of the aiming screws 60 and 62 is mounted with an aiming nut 66 and 68. These spherical nut 64 and aiming nuts 66 and 68 are engaged with three brackets 18a, 18b and 18c formed on the second lamp unit 18, respectively. The center point of the spherical nut 64 forms an aiming fulcrum A2, the center point of the aiming nut 66 forms an active aiming point B2 in lateral direction and 68, and the center point of the aiming unit 68 forms an active aiming point C2 in vertical direction. As a result, when the aiming screw 60 is turned, the second lamp unit 18 tilts in the lateral direction about a straight (imaginary) line that connects the aiming fulcrum A2 and the active aiming point C2 The second lamp unit 18 tilts in a vertically slant direction (and not in the straight vertical direction) about a straight (imaginary) line that connects the aiming fulcrum A2 and the active aiming point B2 when the aiming screw 62 is turned. In order to carry out the aiming adjustment of the second lamp unit 16 efficiently, the aiming screw 62 is first turned to tilt the unit in the vertically slant direction to a required point, and then the aiming screw 60 is turned to tilt the unit in the lateral direction to a required point.

The above-described leveling mechanism 70 comprises the fulcrum pin 58 and an actuator 72, the actuator 72 being provided in the second supporting portion 14a2 of the lamp body 14. The leveling mechanism 70 makes a leveling adjustment that tilts the second lamp unit 18 up and down depending upon the vehicle running conditions, thus directing the light distribution pattern P (L) for low beam at an optimum angle with respect to the road surface ahead of the vehicle. The leveling adjustment is performed by moving the fulcrum pin 58 in the longitudinal (front and back) direction using the actuator 72. During this adjustment, the second lamp unit 18 tilts in the vertical direction about a straight (imaginary) line that connects the active aiming point B2 and the active aiming point C2.

Figure 3:
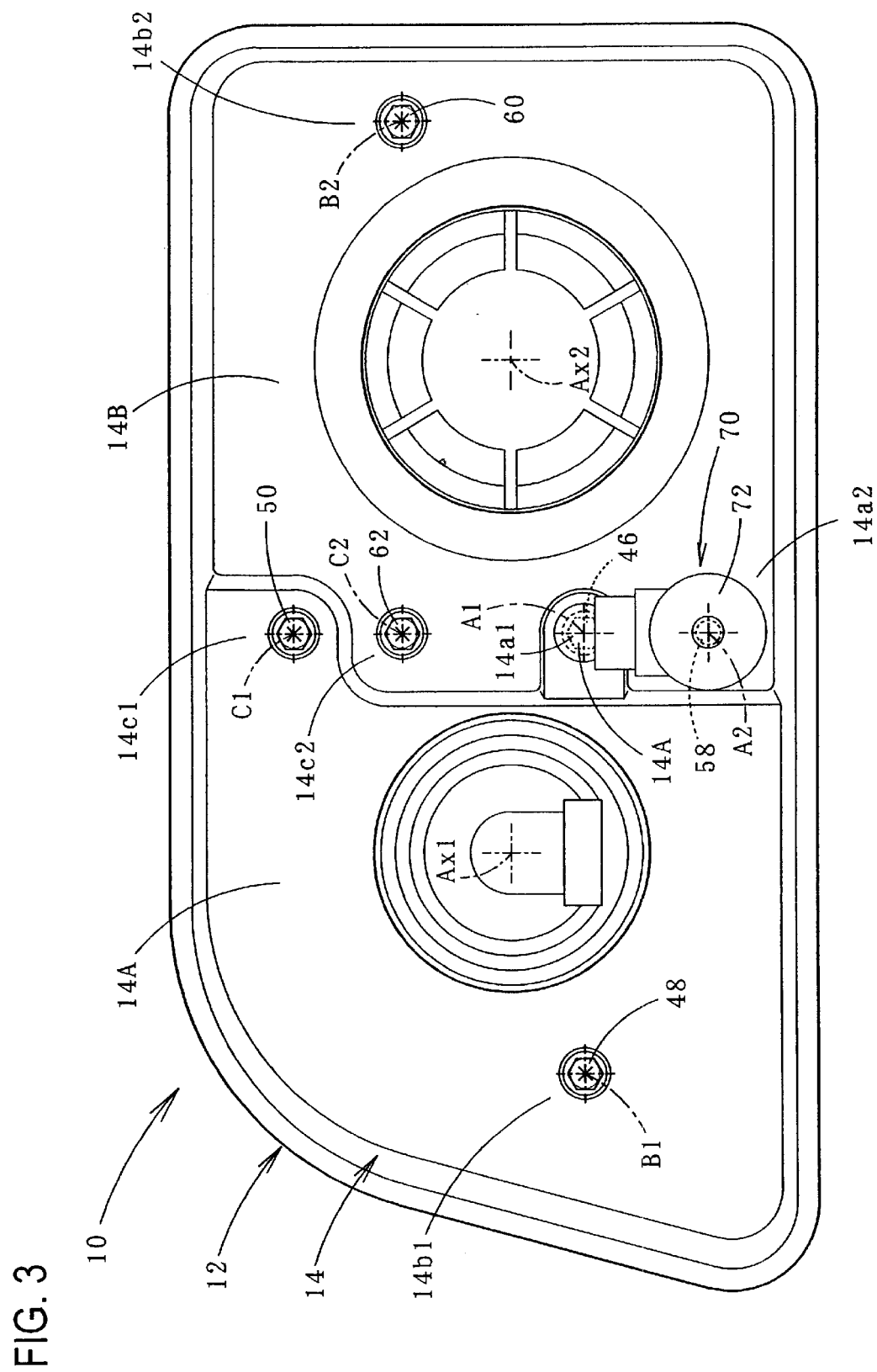
FIG. 3 is a rear elevational view thereof.

As seen from FIGS. 4 and 5, the two first supporting portions 14a1 and 14c1 (corresponding to the aiming fulcrum A1 and the active aiming point C1 in vertical direction of the first aiming mechanism 42) that are located on the outer side in the vehicle width (lateral) direction out of the three first supporting portions 14a1, 14b1 and 14c1, and two the second supporting portions 14a2 and 14c2 (corresponding to the aiming fulcrum A2 and the active aiming point C2 in vertical direction of the second aiming mechanism 44) that are located on the outer side in the vehicle width (lateral) direction out of the three second supporting portions 14a2, 14b2 and 14c2 are provided so that they are at an overlapping position in the lateral direction when the lamp apparatus is viewed from the front (as shown in FIG. 3).

This overlapping position is located at a boundary portion between the front stage portion 14A and the rear stage portion 14B. The first supporting portions 14a1 and 14c1 are formed in the front stage portion 14A, and the second supporting portions 14a2 and 14c2 are formed in the rear stage portion 14B of the lamp body 14. Because of this arrangement, the aiming fulcrum A1 and active aiming point C1 in vertical direction of the first aiming mechanism 42 is offset toward the front (see FIGS. 4 and 5) with respect to the aiming fulcrum A2 and active aiming point C2 in vertical direction of the second aiming mechanism 44. As a result it is ensured that the first lamp unit 16 and first aiming mechanism 42, and the second lamp unit 18 and second aiming mechanism 44, can be disposed three-dimensionally without being interfered with each other.

As described above in detail, in the vehicle headlamp 10, the first and second lamp units 16 and 18 are housed adjacent to each other in the lateral direction in the lamp chamber and provided in a tiltable fashion in the lamp body 14 by the first and the second aiming mechanisms 42 and 44, respectively. Three first supporting portions 14a1, 14b1 and 14c1 are provided in the back of the first lamp unit 16 in the lamp body 14 so that the first supporting portions 14a1, 14b1 and 14c1 respectively support the fulcrum pin 46 and the aiming screws 48 and 50 that constitute the first aiming mechanism 42; also, three second supporting portions 14a2, 14b2 and 14c2 are provided in the back of the second lamp unit 18 in the lamp body 14 so that the second supporting portions 14a2, 14b2 and 14c2 respectively support the fulcrum pin 58 and the aiming screws 60 and 62 that constitute the second aiming mechanism 44. Furthermore, among these supporting portions, the two first supporting portions 14a1 and 14c1 and the two second supporting portions 14a2 and 14c2 are provided so as to overlap each other in the direction of sidewise installation of the two lamp units 16 and 18 when the lamp apparatus is viewed from the front. In other words, as seen from FIGS. 3, 4 and 5, the first supporting portions 14a1 and 14c1 and the second supporting portions 14a2 and 14c2 are provided on an imaginary vertical plane. More specifically, the first supporting portion 14a1 is above and forward the second supporting portions 14a2, and the first supporting portion 14c1 is above and forward the second supporting portion 14c2.

With the structure described above, unlike the conventional structure in which a lamp unit and its aiming mechanism are taken as a,single lamp structural unit and they are disposed parallel to each other independently, in the shown embodiment, two first supporting portions 14a1 and 14c1 and two second supporting portions 14a2 and 14c2 are disposed so as to overlap each other, so that the first lamp unit 16 and its first aiming mechanism 42 are geometrically associated with the second lamp unit 18 and its second aiming mechanism 44. As a result, the width of the lamp apparatus can be reduced with respect to the direction of sidewise installation of the lamp units 16 and 18. According to this embodiment, the lamp apparatus can be made compact with an aiming adjustment being able to be made independently for each one of the two lamp units 16 and 18.

In the vehicle headlamp 10 of the shown embodiment, the front cover 12 is, as seen from FIG. 2, curved so as to extend from the first lamp unit 16 to the second lamp unit 18 toward the back with respect to the direction of two lamp units 16 and 18 that are installed side by side. However, since the second lamp unit 18 is offset toward the back with respect to the first lamp unit 16, the lamp apparatus (headlamp) can be built compact by effectively using the space in the lamp chamber.

Moreover, in the lamp body 14, the rear portion of the first lamp unit 16 is the first stage portion 14A, and the rear portion of the second lamp unit 18 is the second stage portion 14B; and the first supporting portions 14a1 and 14c1 are formed on the front stage portion 14A, and the second supporting portions 14a2 and 14c2 are formed on the rear stage portion 14B. Accordingly, the first lamp unit 16 and first aiming mechanism 42 and the second lamp unit 18 and second aiming mechanism 44 can be installed three-dimensionally without being interfered with each other.

In the shown embodiment, the second lamp unit 18, which is disposed in the back, is of a projector type, and the fulcrum pin 58 and the aiming screws 60 and 62 that constitute the aiming mechanism 44 for the second lamp unit 18 are positioned away from the reflector 30 when the lamp apparatus is viewed from the front. Accordingly, though the reflector 24 and other parts associated with the first lamp unit 16 are provided in front of the fulcrum pin 58 and aiming screws 60 and 62, the lamp light distribution performance of the second lamp unit 18 is not hindered, and the width of the lamp apparatus can be reduced effectively.

In the above embodiment, the front stage portion 14A is located at the same relative position in the vehicle longitudinal direction between the first supporting portions 14a1 and 14c1, and the rear stage portion 14B is located at the same relative position in the vehicle longitudinal direction between the second supporting portions 14a2 and 14c2. It is nonetheless possible to install the front stage portion 14A at a different relative position between the first supporting portions 14a1 and 14c1 and the rear stage portion 14B at a different relative position between the second supporting portions 14a2 and 14c2, as long as the rear stage portion 14B is offset toward the back with respect to the front stage portion 14A.

Figure 7:
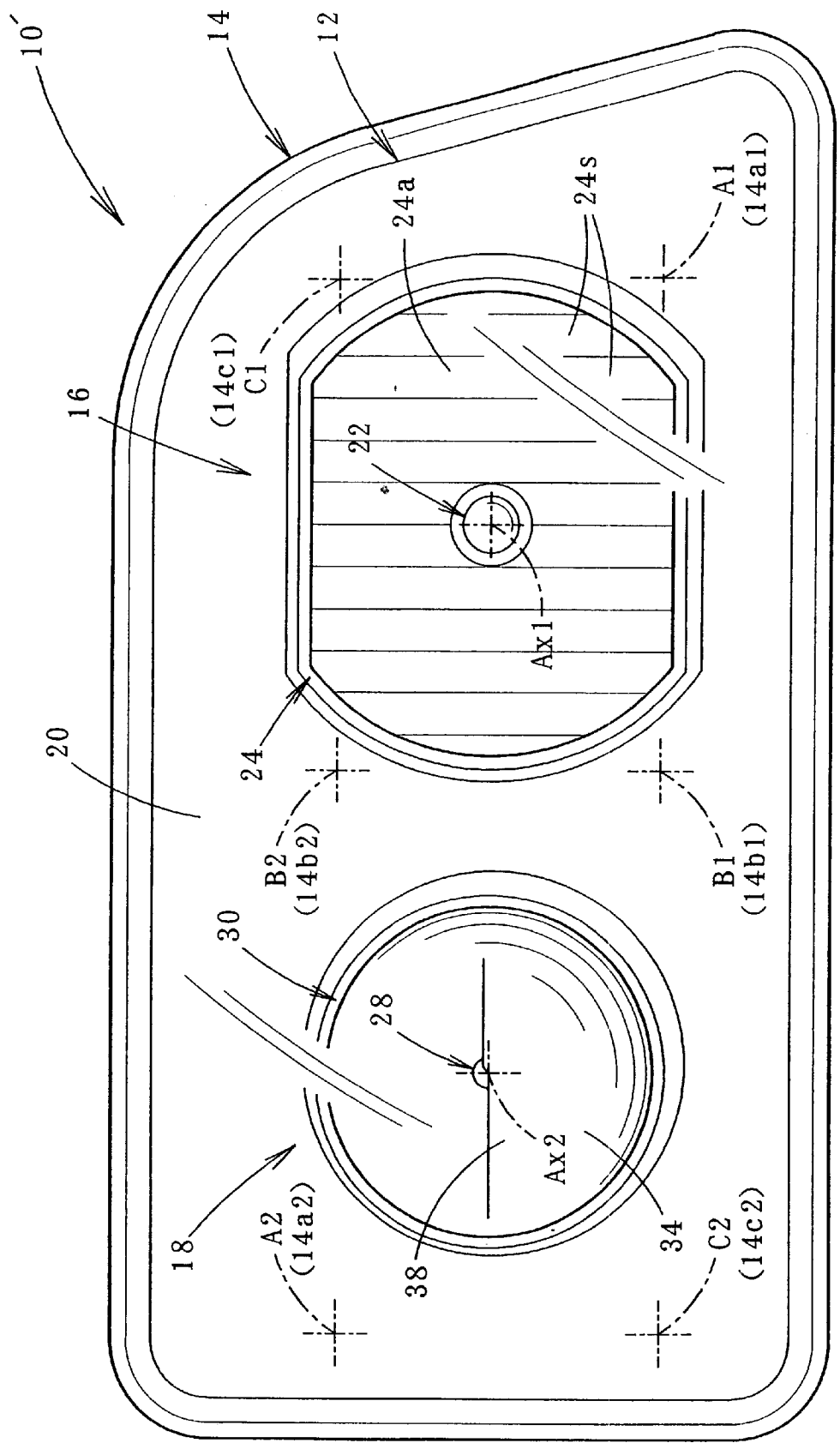
FIG. 7 is a front elevational view of another embodiment of the present invention.

Furthermore, in the shown embodiment, the two first supporting portions 14a1 and 14c1 of the total of three first supporting portions 14a1, 14b1 and 14c1 and the two second supporting portions 14a2 and 14c2 of the total of three second supporting portions 14a2, 14b2 and 14c2 are disposed so as to overlap each other in the direction of sidewise installation of the two lamp units 16 and 18 when the lamp apparatus is viewed from the front. In another possible embodiment, only part of the three first supporting portions 14a1, 14b1 and 14c1 and part of the three second supporting portions 14a2, 14b2 and 14c2 are disposed to overlap each other. For example, in the vehicle headlamp 10' shown in FIG. 7, only the first supporting portion 14b1 (B1) of the three first supporting portions 14a1, 14b1 and 14c1 and only the second supporting portion 14b2 (B2) of the three second supporting portions 14a2, 14b2 and 14c2 are disposed so as to overlap. In this arrangement either, it is possible to reduce the width of the lamp apparatus in the direction of sidewise installation of the two lamp units 16 and 18, thus allowing the lamp apparatus to be built compact, and allowing an aiming adjustment to be made independently for each one of the lamp units 16 and 18.

What is claimed is:

1. A vehicle headlamp, in which separate first and second lamp units are housed adjacent to each other in a lamp chamber defined by a front cover and a lamp body, said lamp units being tiltable in said lamp body by separate first and second aiming mechanisms, respectively, wherein:

a plurality of first supporting portions for supporting a plurality of aiming members that constitute said first aiming mechanism are provided in a rear portion of said fist lamp unit in said lamp body, and a plurality of second supporting portions for supporting a plurality of aiming members that constitute said second aiming mechanism are provided in a rear portion of said second lamp unit in said lamp body, and at least one of said plurality of said first supporting portions and at least one of said plurality of said second supporting portions are provided so as to overlap each other in a direction in which said lamp units are disposed when said headlamp is viewed from front.

2. The vehicle headlamp according to claim 1, wherein said second lamp unit is offset toward back with respect to said first lamp unit; and said front cover is curved so as to extend from said first lamp unit to said second lamp unit and toward back with respect to a direction in which said lamp units are installed.

3. The vehicle headlamp according to claim 2, wherein a front stage portion and a rear stage portion, which are offset from each other in a longitudinal direction, are formed so that at least one of said first supporting portions overlap at least one of said second supporting portions; and at least one of said first supporting portions is provided on said front stage portion, and at least one of said second supporting portions is provided on said rear stage portion.

4. The vehicle headlamp according to claim 2, wherein said second lamp unit comprises:

a light source generally coaxially disposed with an optical axis that extends in a vehicle longitudinal direction;

a reflector that reflects a light from said light source toward a front and toward said optical axis; and a condensing lens provided in front of said reflector.

5. The vehicle headlamp according to claim 3, wherein said second lamp unit comprises:

a light source generally coaxially disposed with an optical axis that extends in a vehicle longitudinal direction;

a reflector that reflects a light from said light source toward a front and toward said optical axis; and a condensing lens provided in front of said reflector.

6. The vehicle headlamp according to claim 2, wherein a light source of said second lamp unit is a discharge light emitting portion of a discharge bulb.

7. The vehicle headlamp according to claim 3, wherein a light source of said second lamp unit is a discharge light emitting portion of a discharge bulb.

8. The vehicle headlamp according to claim 4, wherein a light source of said second lamp unit is a discharge light emitting portion of a discharge bulb.

9. The vehicle headlamp according to claim 5, wherein a light source of said second lamp unit is a discharge light emitting portion of a discharge bulb.

10. A vehicle headlamp, in which separate first and second lamp units are housed adjacent to each other in a lamp chamber defined by a front cover and a lamp body, said lamp units being tiltable in said lamp body by separate first and second aiming mechanisms, respectively, wherein:

a plurality of fist supporting portions for supporting a plurality of aiming members that constitute said first aiming mechanism are provided in a rear portion of said first lamp unit in said lamp body, and a plurality of second support portions for supporting a plurality of aiming members that constitute said second aiming mechanism are provided in a rear portion of said second lamp unit in said lamp body, and at least one of said plurality of said first supporting portions and at least one of said plurality of said second supporting portions are provided so as to be one above the other in a direction of a height of said lamp body.

* * * * *